US007247196B2

(12) United States Patent
Sato et al.

(10) Patent No.: US 7,247,196 B2
(45) Date of Patent: *Jul. 24, 2007

(54) INK JET BLACK INK, INK SET, INK JET RECORDING METHOD, INK CARTRIDGE, RECORDING UNIT, AND INK JET RECORDING APPARATUS

(75) Inventors: Shin-ichi Sato, Kawasaki (JP); Jun Yoshizawa, Tokyo (JP); Kunihiko Nakamura, Gotenba (JP); Kumiko Mafune, Kawasaki (JP); Hideki Takayama, Fujisawa (JP); Daiji Okamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/362,029

(22) Filed: Feb. 27, 2006

(65) Prior Publication Data
US 2006/0146108 A1 Jul. 6, 2006

Related U.S. Application Data

(63) Continuation of application No. PCT/JP2005/016359, filed on Aug. 31, 2005.

(30) Foreign Application Priority Data

Aug. 31, 2004 (JP) ............................. 2004-252204
Aug. 26, 2005 (JP) ............................. 2005-246157

(51) Int. Cl.
*C09D 11/02* (2006.01)
*B41J 2/01* (2006.01)

(52) U.S. Cl. .............................. 106/31.52; 106/31.51; 106/31.58; 347/100

(58) Field of Classification Search ............. 106/31.52, 106/31.51, 31.81, 31.8, 31.58, 31.86; 534/806; 347/100
See application file for complete search history.

(56) References Cited

U.S. PATENT DOCUMENTS

| 4,395,288 | A | * | 7/1983 | Eida et al. ................ | 106/31.51 |
| 5,530,105 | A | * | 6/1996 | Yamazaki et al. ......... | 106/31.49 |
| 6,682,592 | B2 | | 1/2004 | Adachi et al. ............ | 106/31.58 |
| 7,128,779 | B2 | * | 10/2006 | Osumi et al. ............. | 106/31.52 |
| 7,144,452 | B2 | * | 12/2006 | Takayama et al. ........ | 106/31.52 |
| 2006/0102048 | A1 | * | 5/2006 | Nakamura et al. ........ | 106/31.52 |
| 2006/0119684 | A1 | * | 6/2006 | Mafune et al. ............. | 347/100 |
| 2006/0137569 | A1 | * | 6/2006 | Osumi et al. ............. | 106/31.13 |
| 2006/0156952 | A1 | * | 7/2006 | Takayama et al. ........ | 106/31.52 |

FOREIGN PATENT DOCUMENTS

| JP | 10-204308 | 8/1998 |
| JP | 2002-241652 | 8/2002 |
| JP | 2002-275400 | 9/2002 |
| JP | 2003-128965 | 5/2003 |
| JP | 2005-36164 | 2/2005 |
| WO | WO 2004/078860 | 9/2004 |

OTHER PUBLICATIONS

English translation of JP2005/068416, Mar. 2005.*
English translation of JP2005/036164, Feb. 2005.*

* cited by examiner

*Primary Examiner*—Helene Klemanski
(74) *Attorney, Agent, or Firm*—Fitzpatrick, Cella, Harper & Scinto

(57) ABSTRACT

To provide an ink jet black ink which has a favorable tint for ink jet black ink, provides high ozone fastness, a high image density, and high sticking recovery property, and is capable of suppressing the decomposition of a compound represented by the following general formula (I) or a salt thereof at the time of storage for a long time period. The ink jet black ink is an ink jet black ink comprising at least a compound represented by the following general formula (I) or a salt thereof as a coloring material, and ethylene glycol or diethylene glycol, wherein the content of ethylene glycol or diethylene glycol is 15 mass % or more and 30 mass % or less with respect to the total mass of the ink jet black ink.
General formula (I)
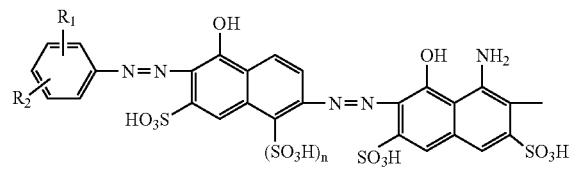
-continued
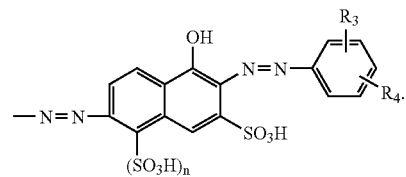
8 Claims, 6 Drawing Sheets

INK JET BLACK INK, INK SET, INK JET RECORDING METHOD, INK CARTRIDGE, RECORDING UNIT, AND INK JET RECORDING APPARATUS

This application is a continuation of International Application No. PCT/JP2005/016359, filed on Aug. 31, 2005, which claims the benefit of Japanese Patent Application No. 2004-252204 filed on Aug. 31, 2004, and No. 2005-246157 filed on Aug. 26, 2005.

BACKGROUND OF THE INVENTION

1. Field of the Invention

The present invention relates to an ink jet ink which has a high image density, is excellent in ozone fastness, and has high sticking recovery property and high storage stability. The present invention also relates to an ink set, an ink jet recording method, an ink cartridge, a recording unit, and an ink jet recording apparatus each using the ink as a black ink.

2. Related Background Art

An ink jet recording method is a recording method of applying a small ink droplet to any one of recording media such as plain paper or glossy media to form an image, and has become rapidly widespread owing to reduction in its costs and improvement in recording rate. With the rapid spread of digital cameras in addition to improvement in the quality of images recorded by the method, the method has been generally used as a method of outputting photographic images comparable to silver halide photographs.

In recent years, image quality has undergone an improvement more than ever owing to, for example, an extreme reduction in size of an ink droplet and an improvement of the color gamut involved in the introduction of multi-color ink. Meanwhile, there have been growing demands for a coloring material and ink, so that more stringent properties have been required in terms of an improvement of color developability and reliability such as sticking property or ejection stability (see, for example, Japanese Patent Laid-Open No. 2000-290552).

SUMMARY OF THE INVENTION

Black ink is required to achieve high weather fastness such as ozone fastness and a high image density.

Methods of achieving high ozone fastness to be considered include (1) improvement of ozone fastness of a dye itself; and (2) improvement of ozone fastness of a recording medium. However, even when weather fastness in a specific recording medium can be improved, the improvement does not mean that weather fastness in any recording medium can be improved, so no fundamental solution can be given to a problem, that is, an improvement of weather fastness. In other words, the ozone fastness of a dye itself must be improved.

Methods of achieving a high image density to be considered include (1) improvement of color developability of a dye itself; (2) increase in a dye concentration in ink; and (3) increase in amount of ink to be applied to a recording medium. However, there is a limitation on the amount of ink to be applied to a recording medium. In addition, it has been difficult to achieve compatibility between an improvement of color developability of a dye itself and an improvement of ozone fastness of the dye. In other words, a dye concentration in ink must be increased. The inventors of the present invention have made a large number of additional studies with a view to improving the ozone fastness of a dye itself. As a result, they have found that a compound represented by the following general formula (I) or a salt thereof has excellent ozone fastness.

General Formula (I)

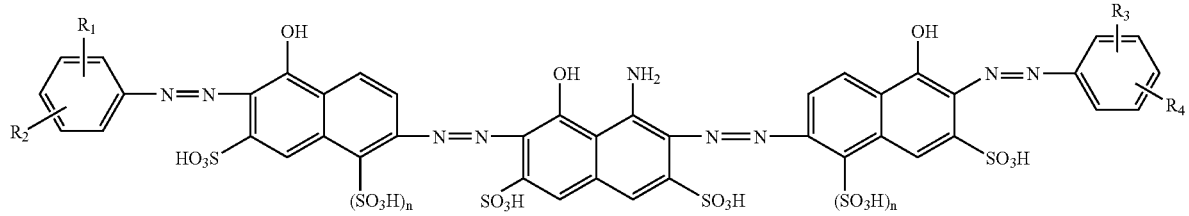

wherein $R_1$, $R_2$, $R_3$ and $R_4$ each independently represent a hydrogen atom; a hydroxyl group; an amino group; a carboxyl group; a sulfonic group; an alkyl group having 1 to 4 carbon atoms; an alkoxy group having 1 to 4 carbon atoms; an alkoxy group substituted with a hydroxyl group, an alkoxy group having 1 to 4 carbon atoms, a sulfonic group, or a carboxyl group; an alkoxy group having 1 to 4 carbon atoms which may be further substituted with a carboxyl group or a sulfonic group; or an amino group substituted with a phenyl group, an alkyl group, or an acyl group, and n represents 0 or 1.

However, it has been found that there is a problem in that a dye which is the compound represented by the general formula (I) or the salt thereof is apt to reduce its sticking recovery property (is apt to stick) at a nozzle of a recording head owing to an increase in a dye concentration in ink. Therefore, it is necessary to use a water-soluble organic solvent or the like excellent in sticking recovery property.

It has also been found that a dye which is the compound represented by the general formula (I) or the salt thereof is greatly influenced by compatibility with a water-soluble organic solvent to be used in combination with the dye. When a general water-soluble organic solvent and the above dye are simply combined, sticking recovery property is apt to reduce. In addition, when the absolute amount of the water-soluble organic solvent is increased for securing sufficient sticking recovery property, the viscosity of ink abruptly increases, so that insufficient supply of the ink is apt to occur.

In addition, the following has also been found. When a dye which is the compound represented by the general formula (I) or the salt thereof and a water-soluble organic solvent are coexistent and stored for a long time period at a high pH, a change in color is apt to occur owing to the decomposition of the compound represented by the general formula (I) or the salt thereof. The problem of change in color is peculiar to the compound represented by the general formula (I) or the salt thereof. It has also been found that the change in color is accelerated as an ink-storing temperature increases.

Therefore, an object of the present invention is to provide an ink jet black ink which: has a favorable tint for ink jet black ink; provides high ozone fastness, a high image density, and high sticking recovery property; and is capable of suppressing the decomposition of the compound represented by the general formula (I) or the salt thereof at the time of storage for a long time period.

Another object of the present invention is to provide an ink set, an ink jet recording method, an ink cartridge, a recording unit, and an ink jet recording apparatus each using the ink jet black ink.

The above objects are achieved by the present invention described below. That is, according to one aspect of the present invention, there is provided an ink jet black ink comprising at least coloring material, wherein the coloring material is a compound represented by the following general formula (I) or a salt thereof, and wherein the ink jet black ink further comprise ethylene glycol or diethylene glycol, and wherein a content of ethylene glycol or diethylene glycol is 15 mass % or more and 30 mass % or less with respect to the total mass of the ink jet black ink:

General Formula (I):

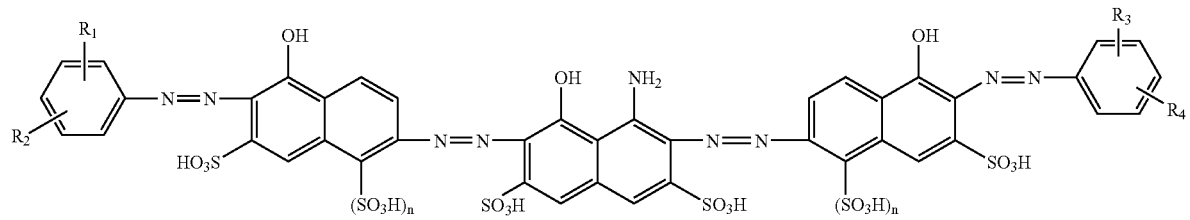

wherein $R_1$, $R_2$, $R_3$ and $R_4$ each independently represent a hydrogen atom; a hydroxyl group; an amino group; a carboxyl group; a sulfonic group; an alkyl group having 1 to 4 carbon atoms; an alkoxy group having 1 to 4 carbon atoms; an alkoxy group substituted with a hydroxyl group, an alkoxy group having 1 to 4 carbon atoms, a sulfonic group, or a carboxyl group; an alkoxy group having 1 to 4 carbon atoms which may be further substituted with a carboxyl group or a sulfonic group; or an amino group substituted with a phenyl group, an alkyl group, or an acyl group, and n represents 0 or 1.

In further aspect of the present invention, the ink jet black ink having the above constitution further comprises a compound represented by the following general formula (II) or a salt thereof as the coloring material:

General Formula (II):

wherein $R_1$ and $R_2$ each independently represent a hydrogen atom; a hydroxyl group; an amino group; a carboxyl group; a sulfonic group; an alkyl group having 1 to 4 carbon atoms; or an alkoxy group having 1 to 4 carbon atoms, and $R_3$ and $R_4$ represent a hydrogen atom; an alkyl group having 1 to 4 carbon atoms; an alkoxy group having 1 to 4 carbon atoms; a hydroxyl group; an alkyl group having 1 to 4 carbon atoms which may be substituted with a hydroxyl group or an alkoxy group having 1 to 4 carbon atoms; an alkoxy group having 1 to 4 carbon atoms which may be substituted with a hydroxyl group, an alkoxy group having 1 to 4 carbon atoms, a sulfonic group, or a carboxyl group; or an amino group substituted with an alkyl group or an acyl group, and n represents 0 or 1.

In further aspect of the present invention, the ink jet black ink further comprises, as the coloring material, at least one compound selected from the group consisting of a condensed dye or a salt thereof of a compound represented by the following general formula (III) and a compound represented by the following general formula (IV) and a dye obtained by the reduction of the condensed dye or the salt thereof wherein the counter ion of the dye after the condensation or reduction is a hydrogen ion, an alkali metal ion, a cation of an organic amine, or an ammonium ion:

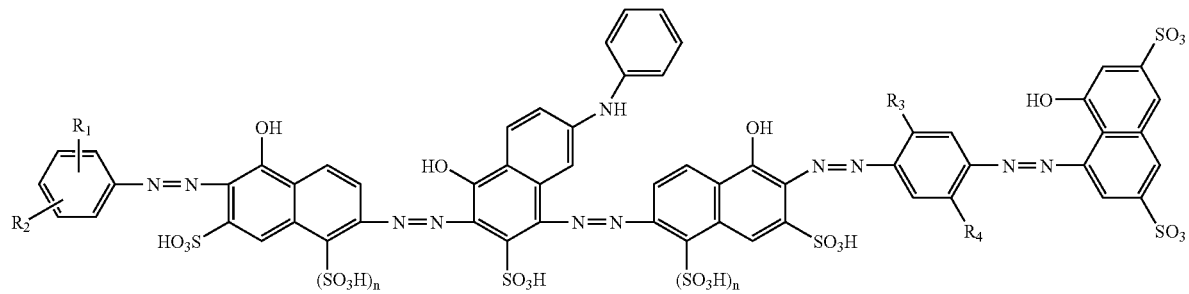

General Formula (III):

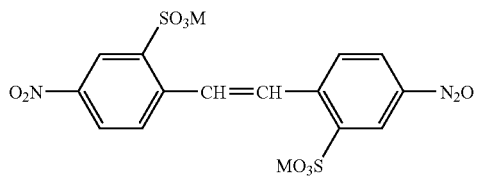

wherein M represents a hydrogen atom or an alkali metal atom,

General Formula (IV):

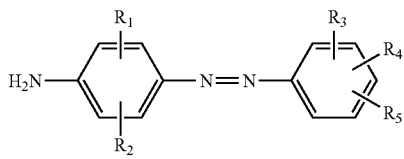

wherein $R_1$, $R_2$, $R_3$, $R_4$ and $R_5$ each independently represent a hydrogen atom; a halogen atom; a hydroxyl group; a sulfonic group; a carboxyl group; an alkyl-group having 1 to 4 carbon atoms; or an alkoxy group having 1 to 4 carbon atoms.

According to another aspect of the present invention, there is provided an ink set comprising a plurality of inks, the ink set comprising the ink jet black ink having the above constitution as the black ink.

According to another aspect of the present invention, there is provided an ink jet recording method, comprising ejecting an ink by an ink jet method, wherein the ink comprises an ink jet black ink having the above constitution.

According to another aspect of the present invention, there is provided an ink cartridge, comprising an ink storage portion for storing ink, wherein the ink comprises an ink jet black ink having the above constitution.

According to another aspect of the present invention, there is provided a recording unit, comprising an ink storage portion for storing ink and a recording head for ejecting an ink, wherein the ink is an ink jet black ink having the above constitution.

According to another aspect of the present invention, there is provided an ink jet recording apparatus, comprising an ink storage portion for storing an ink, and a recording head for ejecting the ink, wherein the ink is an ink jet black ink having the above constitution.

According to the present invention, there can be provided an ink jet black ink having high ozone fastness, high sticking recovery property, and high storage stability as the ink jet black ink.

According to the present invention, there can be provided an ink jet black ink capable of forming a high image density as ink jet black ink.

According to the present invention, there can be provided an ink jet black ink having a favorable tint as ink jet black ink.

According to the present invention, there can be provided an ink set, an ink jet recording method, an ink cartridge, a recording unit, and an ink jet recording apparatus each using the above-described ink jet black ink.

DESCRIPTION OF THE PREFERRED EMBODIMENTS

Figure 1:
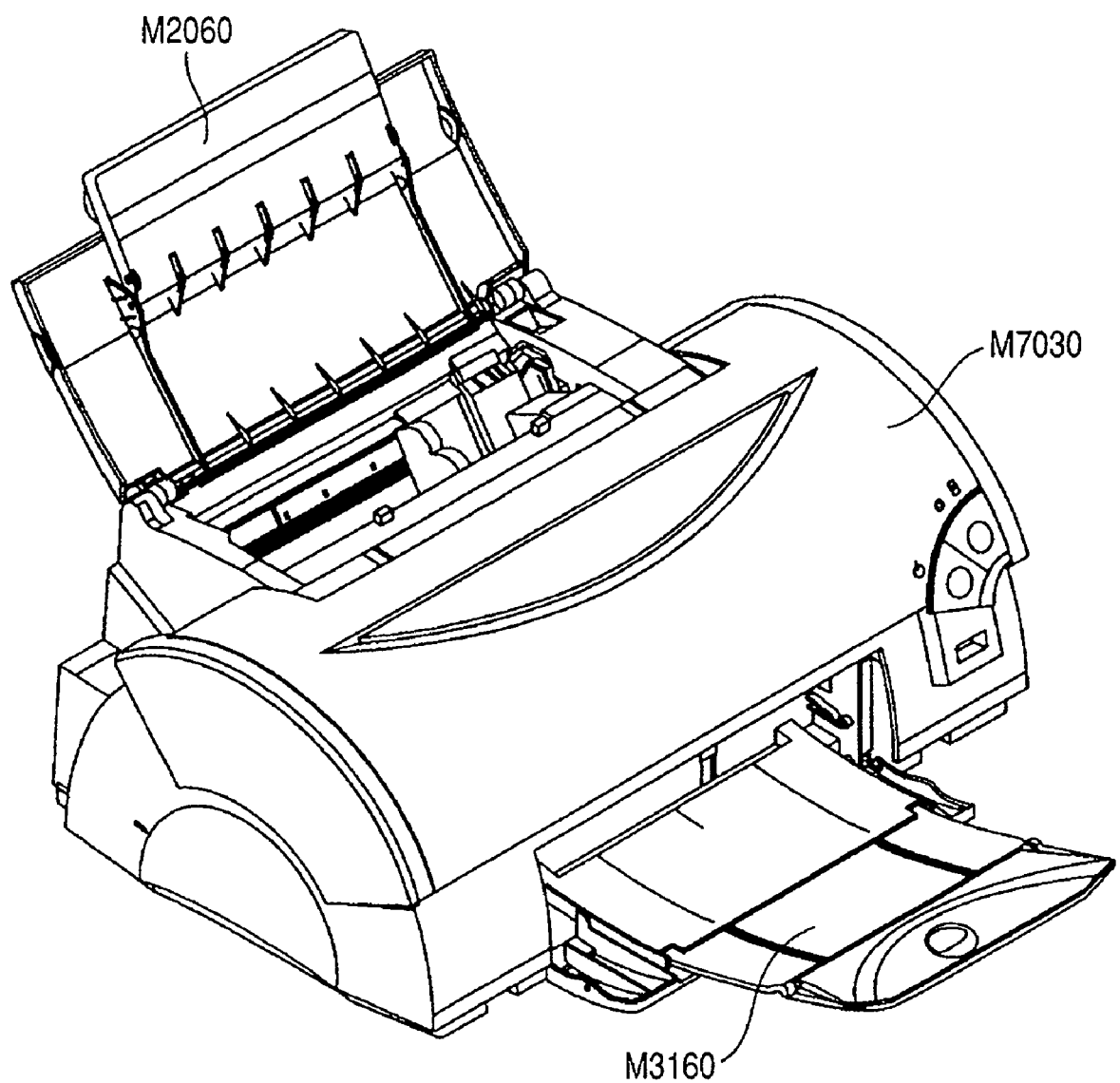
FIG. 1 is a perspective view of a recording apparatus.

Hereinafter, the present invention will be described in more detail by way of preferred embodiments.

In the present invention, when a compound is a salt, the salt is dissociated into ions in ink, but this state is represented by using the phrase "contains a salt" for convenience.

The inventors of the present invention have made extensive studies in view of the above objects. As a result, they have found that a compound represented by the general formula (I) or a salt thereof is particularly compatible with each of ethylene glycol and diethylene glycol, is effective in improving sticking recovery property, shows a moderate increase in viscosity of ink, and is excellent in storage stability. In particular, a significant effect is obtained when the content of ethylene glycol or diethylene glycol is 15 mass % or more and 30 mass % or less with respect to the total mass of ink jet black ink. The content of ethylene glycol or diethylene glycol in typical ink jet ink is about 10 mass % with respect to the total mass of the ink. However, a content of about 10 mass % may reduce sticking recovery property and continuous ejection property depending on an ink composition. In other words, sufficient effects on the above objects are obtained only when the content of ethylene glycol or diethylene glycol becomes 15 mass % or more and 30 mass % or less.

<Ink>

Hereinafter, components constituting the ink jet black ink according to the present invention (which may hereinafter be simply referred to as the ink) and the like will be described in detail.

(Coloring Material)

The coloring material to be used for the ink of the present invention is a compound represented by the following general formula (I) or a salt thereof.

General formula (I)

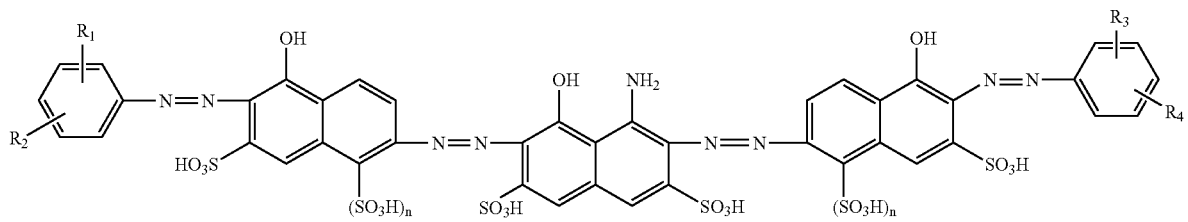

In the general formula (I), $R_1$, $R_2$, $R_3$ and $R_4$ each independently represent: a hydrogen atom; a hydroxyl group; an amino group a carboxyl group; a sulfonic group; an alkyl group having 1 to 4 carbon atoms; an alkoxy group having 1 to 4 carbon atoms; an alkoxy group substituted with a hydroxyl group, an alkoxy group having 1 to 4 carbon atoms, a sulfonic group, or a carboxyl group; an alkoxy group having 1 to 4 carbon atoms which may be further substituted with a carboxyl group or a sulfonic group; or an amino group substituted with a phenyl group, an alkyl group, or an acyl group, and n represents 0 or 1. The case of n=0 in the general formula (I) of the present invention means that H is placed at the position of $SO_3H$ as shown in Exemplified Compound 1 shown below.

In particular, in the present invention, the compound represented by the general formula (I) or the salt thereof is preferably Exemplified Compound 1 shown below.

Exemplified Compound 1

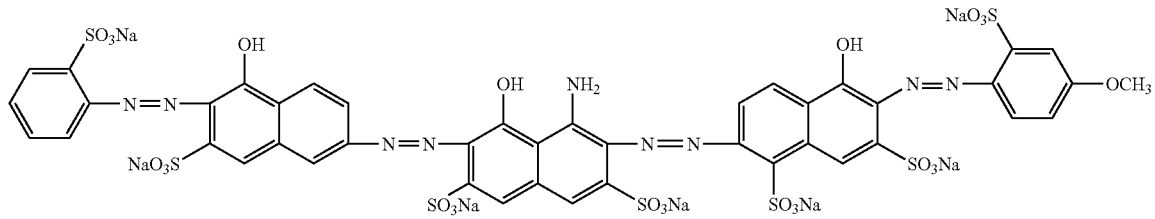

The content of the coloring material which is the compound represented by the general formula (I) or the salt thereof in the ink of the present invention is preferably 0.1 mass % or more and 10.0 mass % or less with respect to the total mass of the ink. This is because a content of less than 0.1 mass % may fail to provide one effect of the present invention, that is, a sufficient image density, while a content in excess of 10.0 mass % may fail to provide another effect of the present invention, that is, sticking recovery property. To achieve a high image density, the content is preferably 3.0 mass % or more and 10.0 mass % or less. To achieve a higher image density, the content is preferably 4.5 mass % or more and 10.0 mass % or less.

In the ink of the present invention, the compound represented by the general formula (I) or the salt thereof may be used alone, or may be used in combination with another coloring material in order to adjust a color tone, provided that the content of the compound represented by the general formula (I) or the salt thereof is preferably 0.1 mass % or more and 3.0 mass % or less, or more preferably 0.5 mass % or more with respect to the total mass of the ink in order to sufficiently exert the effects of the present invention when the compound represented by the general formula (I) or the salt thereof is used in combination with another coloring material. In addition, a mass ratio between the content of the compound represented by the general formula (I) or the salt thereof and the content of the other coloring material is preferably 2:1 or more and 1: 10 or less.

The compound represented by the general formula (I) or the salt thereof is preferably used in combination with a compound represented by the following general formula (II) or a salt thereof. Furthermore, the compound represented by the general formula (I) or the salt thereof is preferably used in combination with a condensed dye or a salt thereof of 4,4'-dinitrostilbene-2,2'-disulfonic acid represented by the following general formula (III) and a compound represented by the following general formula (IV) or a dye obtained by the reduction of the condensed dye (the counter ion of the dye after the condensation or reduction is a hydrogen ion, an alkali metal ion, a cation of an organic amine, or an ammonium ion). Those compounds are preferable because each of them provides a high image density and has a small C*, so that blacklike black ink can be obtained. The C* means chroma representing the degree of color definition. The neutrality of a hue increases with decreasing C*.

In order to sufficiently obtain the above effects, a mass ratio between the compound represented by the general formula (I) or the salt thereof and the compound represented by the general formula (II) or the salt thereof in the ink is preferably 2:1 or more and 1:5 or less. In addition, in order to sufficiently obtain the above effects, a mass ratio between the compound represented by the general formula (I) or the salt thereof and the condensed dye composed of the compounds represented by the following general formulae (III) and (IV) in the ink is preferably 2:1 or more and 1:5 or less.

General formula (II)

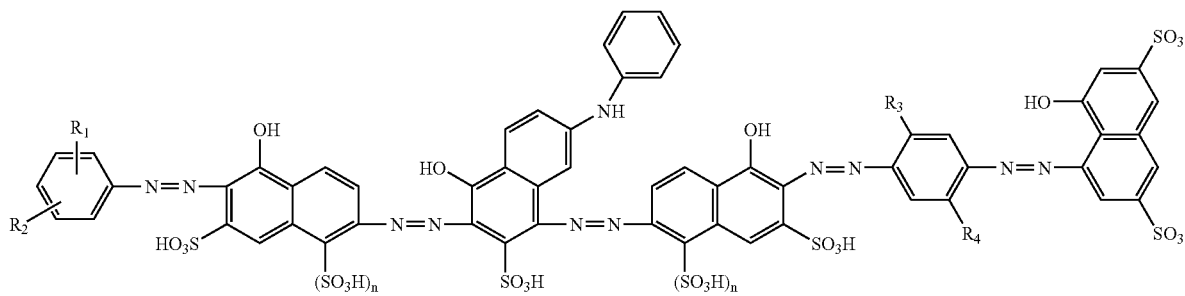

In the general formula (II), $R_1$ and $R_2$ each independently represent a hydrogen atom; a hydroxyl group; an amino group; a carboxyl group; a sulfonic group; an alkyl group having 1 to 4 carbon atoms; or an alkoxy group having 1 to 4 carbon atoms, and $R_3$ and $R_4$ represent a hydrogen atom; an alkyl group having 1 to 4 carbon atoms; an alkoxy group having 1 to 4 carbon atoms; a hydroxyl group; an alkyl group having 1 to 4 carbon atoms which may be substituted with a hydroxyl group or an alkoxy group having 1 to 4 carbon atoms; an alkoxy group having 1 to 4 carbon atoms which may be substituted with a hydroxyl group, an alkoxy group having 1 to 4 carbon atoms, a sulfonic group, or a carboxyl group; or an amino group substituted with an alkyl group or an acyl group, and n represents 0 or 1. The case of n=0 in the general formula (II) of the present invention means that H is placed at the position of $SO_3H$ as in the case of the general formula (I).

Exemplified Compound 2

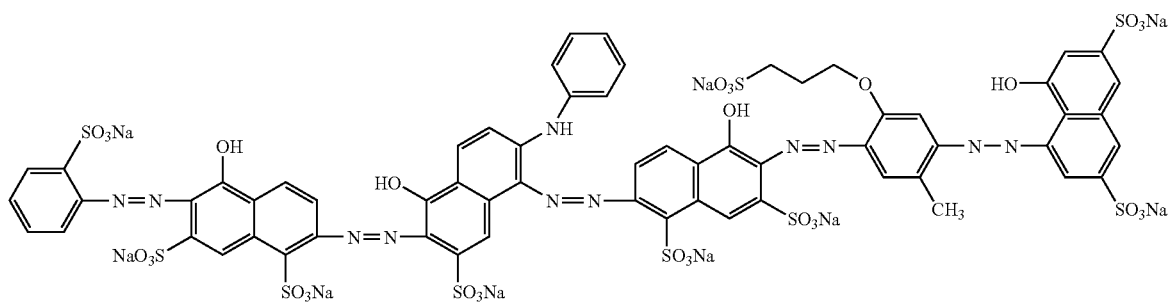

General formula (III)

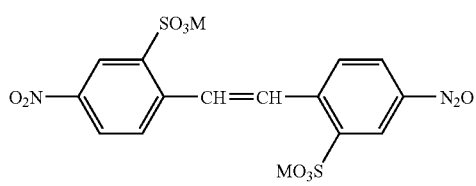

In the general formula (III), M represents a hydrogen atom or an alkali metal atom.

General formula (IV)

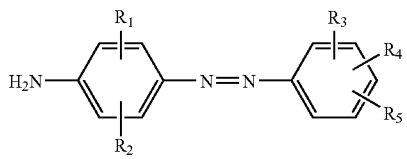

In the general formula (IV), $R_1$, $R_2$, $R_3$, $R_4$ and $R_5$ each independently represent a hydrogen atom; a halogen atom; a hydroxyl group; a sulfonic group; a carboxyl group; an alkyl group having 1 to 4 carbon atoms; or an alkoxy group having 1 to 4 carbon atoms.

[Method of Testing Dye]

The coloring material to be used in the present invention can be tested by the following methods (1) to (3) each of which involves the use of high performance liquid chromatography (HPLC).

(1) Retention time of a peak (2) Maximum absorption wavelength in the peak of (1)

(3) M/Z (posi, nega) of mass spectrum at a peak of (1).

Analysis conditions for high performance liquid chromatography are as shown below. An ink solution diluted 1,000 times with pure water is analyzed by means of high performance liquid chromatography under the following conditions to measure the retention time of a main peak and the maximum absorption wavelength of the peak.

Column: Symmetry C18 2.1 mm×150 mm
Column temperature: 40° C.
Flow rate: 0.2 ml/min
PDA: 210 nm to 700 nm
Mobile phase and gradient condition: Table 1

TABLE 1

|  | 0-5 min | 5-40 min | 40-45 min |
|---|---|---|---|
| A Water | 85% | 85% → 0% | 0% |
| B Methanol | 10% | 10% → 95% | 95% |
| C 0.2-mol/l aqueous solution of ammonium acetate | 5% | 5% | 5% |

In addition, analysis conditions for a mass spectrum are as shown below. The mass spectrum of the resultant peak is measured under the following conditions, and the most strongly detected M/Z is measured for each of posi and nega.

| Ionization method | | |
|---|---|---|
| ESI | Capillary voltage | 3.5 kV |
| | Desolvating gas | 300° C. |
| | Ion source temperature | 120° C. |
| Detector | posi | 40 V 200-1,500 amu/0.9 sec |
| | nega | 40 V 200-1,500 amu/0.9 sec |

Table 2 shows the values of the retention time, maximum absorption wavelength, M/Z (posi), and M/Z (nega) of each of Exemplified Compounds 1 and 2, and of C.I. Direct Orange 39 which is the condensed dye of the compounds represented by the general formulae (III) and (IV). When a compound has a value shown in Table 2, the compound can be judged to be a compound to be used in the present invention.

TABLE 2

| | Retention time [min] | Maximum absorption wavelength [nm] | M/Z | |
|---|---|---|---|---|
| | | | Posi | Nega |
| Exemplified Compound 1 | 15-17 | 645-665 | 1315-1316 | 172-173 |
| Exemplified Compound 2 | 25-27 | 565-585 | 833-834 | 554-555 |
| C.I. Direct Orange 39 | 30-32 | 400-420 | 916-918 | 304-305 |

(Aqueous Medium)

[Ethylene Glycol or Diethylene Glycol]

The ink of the present invention is characterized by containing at least ethylene glycol or diethylene glycol at a content of 15 mass % or more and 30 mass % or less with respect to the total mass of the ink. Each of those water-soluble organic solvents has high moisture retention and high solubility with respect to the general formula (I), so that each of those water-soluble organic solvents is useful in improving sticking recovery property and shows a small increase in viscosity. For example, the solubility of Exemplified Compound 1 in each of ethylene glycol and diethylene glycol at 25° C. exceeds 20 mass %. As described above, each of ethylene glycol and diethylene glycol has high solubility, so that each of ethylene glycol and diethylene glycol can suppress the viscosity of the ink to the extent that ink jet characteristics can be maintained even when an amount of each of ethylene glycol and diethylene glycol sufficient to impart sticking recovery property is added to the ink. Furthermore, ink containing ethylene glycol or diethylene glycol is excellent in storage stability when stored for a long time period.

The content of ethylene glycol or diethylene glycol in the ink according to the present invention is essentially 15 mass % or more and 30 mass % or less with respect to the total mass of the ink. The reason for this is as follows. When the content is 15 mass % or more, the compound represented by the general formula (I) or the salt thereof can be sufficiently dissolved even when the ink evaporates near a nozzle, and an abrupt increase in viscosity of the ink can be alleviated and insufficient ejection can be prevented. When the content exceeds 30 mass %, the viscosity of the ink becomes so high that it becomes difficult to use the ink as the ink jet ink, although, when the content is 30 mass % or less, an increase in viscosity of the ink can be suppressed by using ethylene glycol or diethylene glycol in combination with the compound represented by the general formula (I) or the salt thereof.

[Other Water-Soluble Organic Solvents and Water]

In the ink of the present invention, in addition to ethylene glycol or diethylene glycol described above, water or a mixed solvent of water and any one of various water-soluble organic solvents can be used as long as the addition of water or the mixed solvent provides an effect and the objects and effects of the present invention are not impaired. The water-soluble organic solvents are not particularly limited as long as they are water-soluble, and examples thereof include an alcohol, a polyhydric alcohol, polyglycol, glycol ether, a nitrogen-containing polar solvent, and a sulfur-containing polar solvent. The total content of those water-soluble organic solvents is preferably 10 mass % or less with respect to the total mass of the ink. This is because an effect of the combined use of the coloring material represented by the general formula (I) and ethylene glycol or diethylene glycol can be sufficiently exerted. Deionized water (ion-exchanged water) is preferably used as water. The water content is preferably 10 mass % to 84 mass % with respect to the total mass of the ink.

(Other Additives)

In addition, in the present invention, various additives such as a surfactant, a rust inhibitor, an antiseptic, a mildewproofing agent, an antioxidant, an anti-reducing agent, an evaporation promoter, a chelating agent, and a water-soluble polymer may be incorporated as required.

<Recording Medium>

Any recording medium can be used for forming an image by the ink of the present invention as long as recording is performed by applying the ink to the recording medium.

The present invention is applicable to a recording medium in which a coloring material such as a dye or a pigment is adsorbed to a fine particle forming a porous structure in an ink-receiving layer and an image is formed from at least the fine particles having the coloring material adsorbed thereto, and the present invention is particularly suitable for the case where an ink jet method is used. Such ink jet recording medium is preferably of a so-called absorption type in which ink is absorbed by a gap formed in an ink-receiving layer on a support.

An absorption type ink-receiving layer is constituted as a porous layer mainly composed of a fine particles and, if necessary, containing a binder and any other additive. Specific examples of the fine particles include inorganic pigments such as silica, clay, talc, calcium carbonate, kaolin, aluminum oxide, for example, alumina or alumina hydrate, diatomaceous earth, titanium oxide, hydrotalcite, and zinc oxide; and organic pigments such as a urea formalin resin, an ethylene resin, and a styrene resin. One or more kinds of them are used. Examples of a binder that is suitably used include a water-soluble polymer and a latex. Examples of an available binder include polyvinyl alcohol or a denatured product thereof; starch or a denatured product thereof; gelatin or a denatured product thereof; gum arabic; cellulose derivatives such as carboxymethylcellulose, hydroxyethylcellulose, and hydroxyproylmethylcellulose; vinyl-based copolymer latexes such as an SBR latex, an NBR latex, a methyl methacrylate-butadiene copolymer latex, a functional group-denatured polymer latex, and an ethylene-vinyl acetate copolymer; polyvinyl pyrrolidone; maleic anhydride or a copolymer thereof; and an acrylate copolymer. Two or more kinds of them can be used in combination as required. In addition, an additive may be used, and examples of an additive to be used as required include a dispersant, a thickener, a pH adjustor, a lubricant, a fluidity denaturing agent, a surfactant, a defoaming agent, a releasing agent, a fluorescent bleach, a UV absorber, and an antioxidant.

In particular, a recording medium having an ink-receiving layer formed therein and mainly composed of fine particles having an average particle size of 1 µm or less is preferably used in the present invention. Particularly preferable examples of the fine particles include silica fine particles and aluminum oxide fine particles. Preferable silica fine particles are silica fine particles typified by colloidal silica. Colloidal silica, which itself is available from the market, is particularly preferably that described in Japanese Patent Nos. 2803134 and 2881847. Preferable aluminum oxide fine particles are alumina hydrate fine particles and the like. An alumina hydrate represented by the following general formula can be exemplified as one example of such alumina hydrate fine particles.

$Al_2O_{3-n}(OH)_{2n} \cdot mH_2O$ (In the above formula, n represents an integer of 1, 2 or 3, and m represents a value of 0 to 10, or preferably 0 to 5, provided that m and n cannot be simultaneously 0. m may be or may not be an integer because $mH_2O$ also represents an aqueous phase that can desorb and is not involved in the formation of an $mH_2O$ crystal lattice in many cases. In addition, heating such kind of material may cause m to reach 0.)

An alumina hydrate can be produced by a conventionally known method such as the hydrolysis of aluminum alkoxide or sodium aluminate described in U.S. Pat. Nos. 4,242,271 and 4,202,870; or a method of adding an aqueous solution of sodium sulfate, aluminum chloride or the like to an aqueous solution of sodium aluminate or the like to perform neutralization described in JP 57-44605 B.

The recording medium preferably has a support for supporting the above-described ink-receiving layer. Any support can be used without any particular limitation as long as its ink-receiving layer can be formed of the above-described porous fine particles and the support provides rigidity of the recording medium such that the support can be conveyed by a conveying mechanism of an ink jet printer or the like. Specific examples thereof include a paper support formed of a pulp raw material mainly composed of natural cellulose fibers; a plastic support composed of a material such as polyester (for example, polyethylene terephthalate), cellulose triacetate, polycarbonate, polyvinyl chloride, polypropylene, or polyimide; resin-coated paper (for example, RC paper) having, on at least one side of base paper, a polyolefin resin coating layer added with a white pigment or the like.

<Ink Set>

The ink of the present invention can be preferably used in combination with any other ink to provide an ink set. The term "ink set" as used herein includes a state where the ink of the present invention is used in combination with any other ink such as cyan ink, magenta ink, yellow ink, or black ink. The other ink that can be used in combination with the ink of the present invention to provide an ink set is not particularly limited. The term "ink set" as used herein includes, of course, an ink tank itself obtained by integrating a plurality of ink tanks. The term also includes a state where a plurality of separate ink tanks are used in combination and a state where those ink tanks are integrated with a recording head.

<Ink Jet Recording Method>

The ink according to the present invention is particularly suitably used for an ink jet recording method of ejecting the ink by means of an ink jet method. Examples of the ink jet recording method include a recording method of applying mechanical energy to ink to eject the ink and a recording method of applying thermal energy to ink to eject the ink. An ink jet recording method utilizing thermal energy is particularly preferably used in the present invention.

<Ink Cartridge>

An example of an ink cartridge suitable for performing recording by using the ink according to the present invention includes an ink cartridge including an ink storage portion for storing the ink.

<Recording Unit>

An example of a recording unit suitable for performing recording by using the ink according to the present invention includes a recording unit including: an ink storage portion for storing the ink; and a recording head. In particular, a recording unit in which the recording head applies thermal energy corresponding to a recording signal to the ink to generate an ink droplet by virtue of the energy can be exemplified.

<Ink Jet Recording Apparatus>

An example of a recording apparatus suitable for performing recording by using the ink according to the present invention includes a recording apparatus in which thermal energy corresponding to a recording signal is applied to ink in the chamber of a recording head having an ink storage portion for storing the ink to generate an ink droplet by the energy.

Hereinafter, the schematic constitution of a mechanism portion of an ink jet recording apparatus will be described. A recording apparatus main body is constituted by a sheet feeding portion, a sheet conveying portion, a carriage portion, a sheet discharge portion, and a cleaning portion, and an external packaging portion for protecting them and providing them with design to achieve a role of each mechanism. Hereinafter, the outline of each of them will be described.

Figure 2:
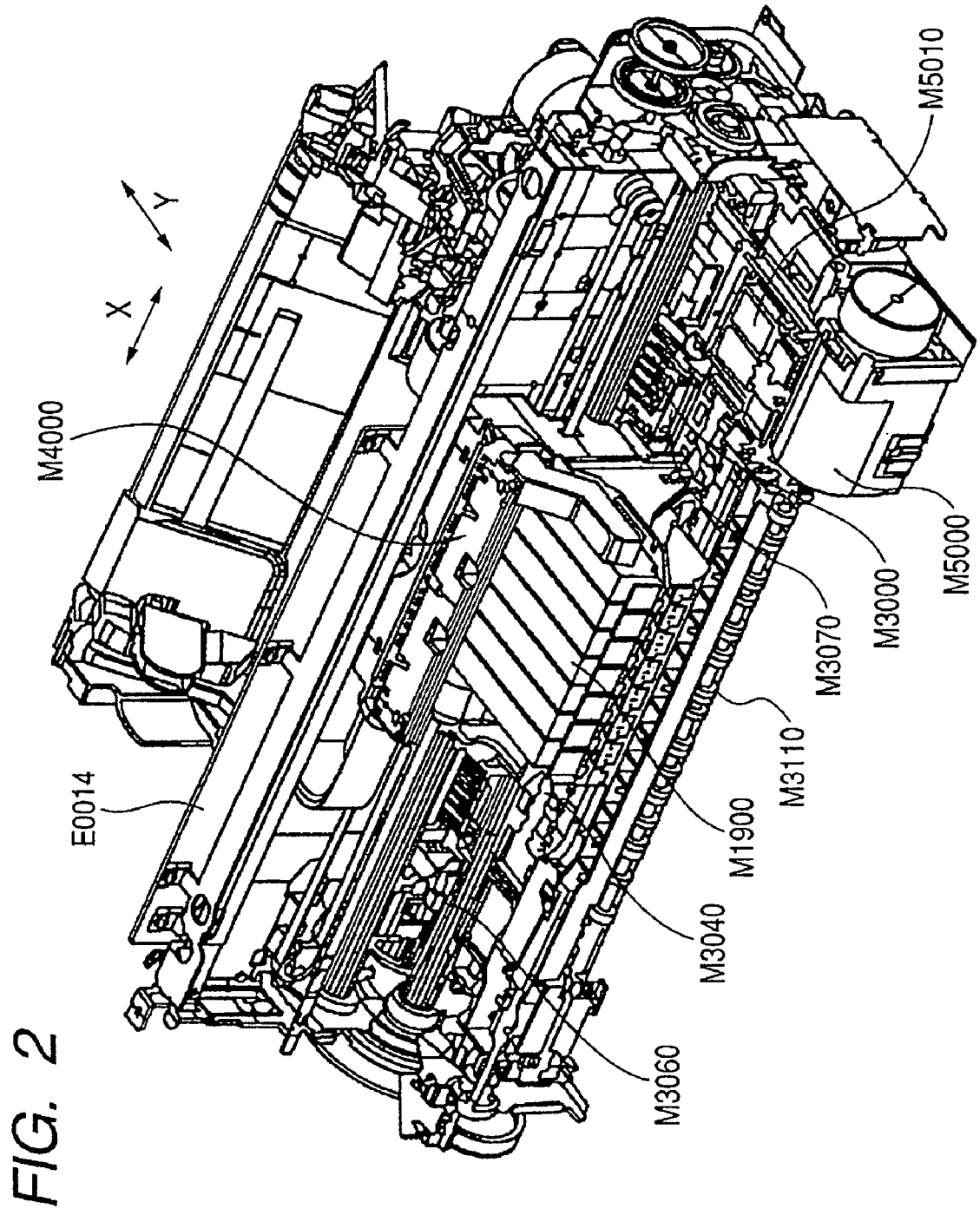
FIG. 2 is a perspective view of a mechanism portion of the recording apparatus.
Figure 3:
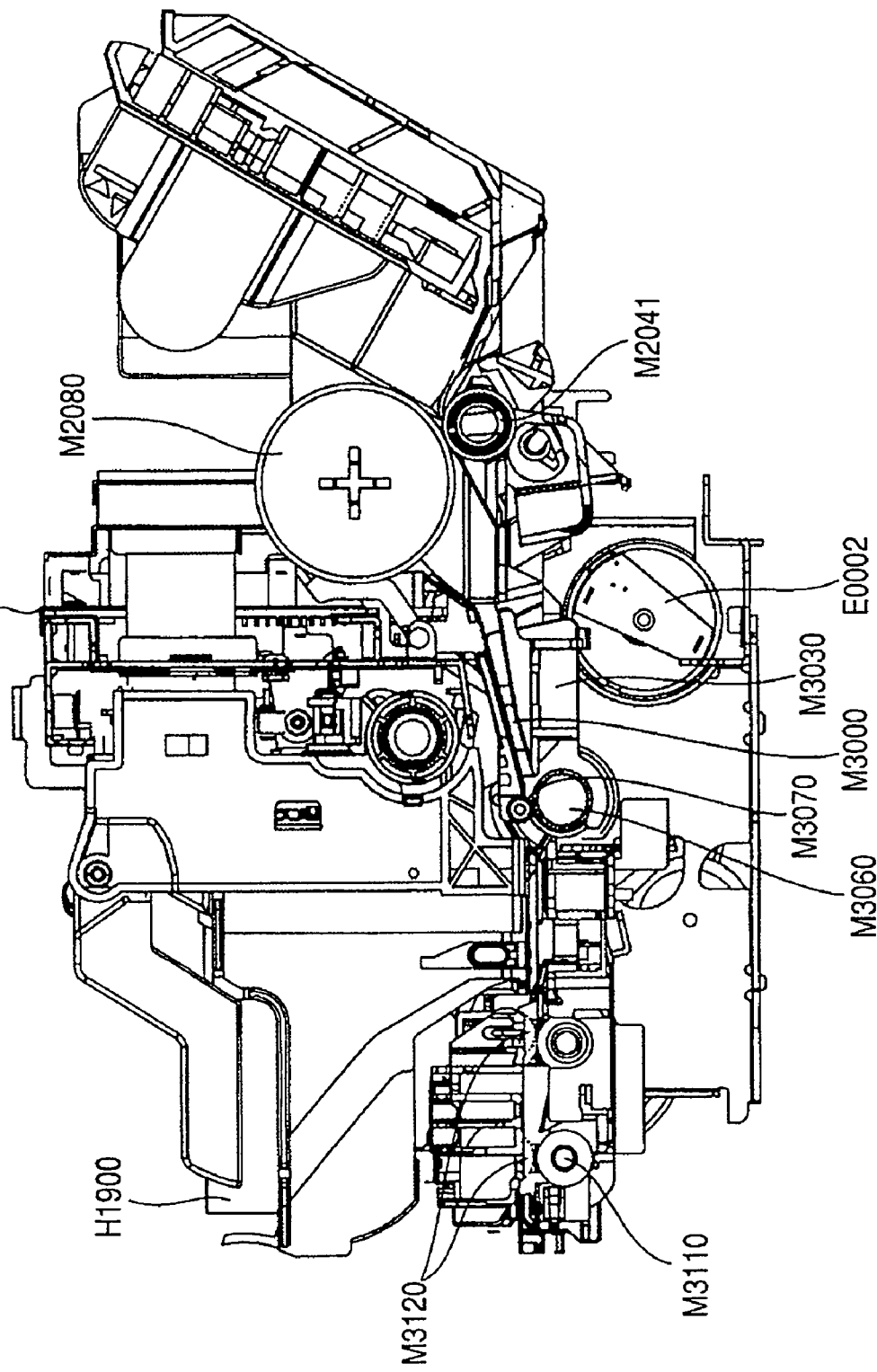
FIG. 3 is a sectional view of the recording apparatus.

FIG. 1 is a perspective view of a recording apparatus. FIGS. 2 and 3 are views for explaining the internal mechanism of a recording apparatus main body. FIG. 2 is a perspective view seen from an upper right portion, and FIG. 3 is a side sectional view of the recording apparatus main body.

When a sheet is to be fed in the recording apparatus, only a predetermined number of recording media are sent to a nip portion composed of a sheet feeding roller M2080 and a separating roller M2041 in the sheet feeding portion including a sheet feeding tray M2060. The sent recording media are separated at the nip portion, and only the uppermost recording medium is conveyed. The recording medium sent to the sheet conveying portion is guided by a pinch roller holder M3000 and a paper guide flapper M3030 to be sent to a roller pair composed of a conveying roller M3060 and a pinch roller M3070. The roller pair composed of the conveying roller M3060 and the pinch roller M3070 are rotated by the driving of an LF motor E0002, and the rotation causes the recording medium to be conveyed on a platen M3040.

In the carriage portion, when an image is to be formed on a recording medium, a recording head H1001 (FIG. 4) is arranged at a target image forming position, and ink is ejected to the recording medium in accordance with a signal from an electrical substrate E0014. Details about the constitution of the recording head H1001 will be described later. While recording is performed by the recording head H1001, recording main scanning of conveying a carriage M4000 in a column direction and sub-scanning of conveying a recording medium in a row direction by the conveying roller M3060 are alternately repeated, whereby an image is formed on the recording medium.

Finally, the recording medium on which an image has been formed is sandwiched at a nip between a first sheet discharge roller M3110 and a spur M3120 in the sheet discharge portion, conveyed, and discharged to a sheet discharge tray M3160.

In the cleaning portion, when a pump M5000 is allowed to act in a state where a cap M5010 is brought into close contact with an ink ejection orifice of the recording head H1001 for the purpose of cleaning the recording head H1001 before and after image recording, unnecessary ink and the like are sucked from the recording head H1001. The ink remaining in the cap M5010 is sucked with the cap M5010 opened, whereby neither sticking of the remaining ink nor a subsequent harmful effect occurs.

(Constitution of Recording Head)

The constitution of a head cartridge H1000 will be described. The head cartridge H1000 includes the recording head H1001, means for mounting ink tanks H1900, and means for supplying ink from the ink tanks H1900 to the recording head, and is detachably mounted on the carriage M4000.

Figure 4:
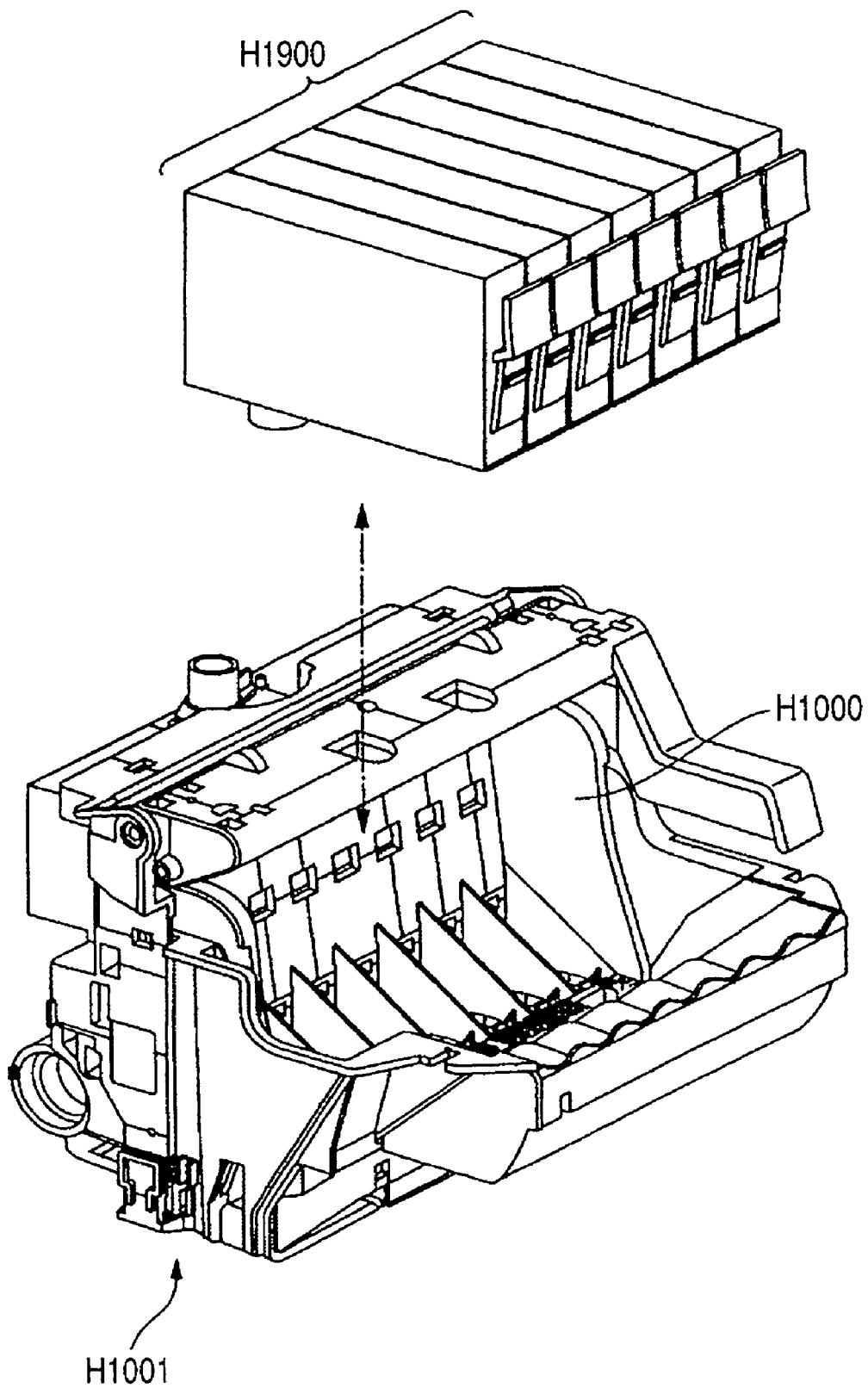
FIG. 4 is a perspective view showing a state where an ink tank is mounted on a head cartridge.

FIG. 4 shows how the ink tanks H1900 are mounted on the head cartridge H1000. The recording apparatus forms an image by using yellow, magenta, cyan, black, light magenta, light cyan, and green inks, and therefore the ink tanks H1900 are independently prepared for seven colors. The ink according to the present invention is used for at least one of the above inks. In addition, as shown in the figure, each ink tank is detachable to the head cartridge H1000. The ink tanks H1900 can be detached in a state where the head cartridge H1000 is mounted on the carriage M4000.

Figure 5:
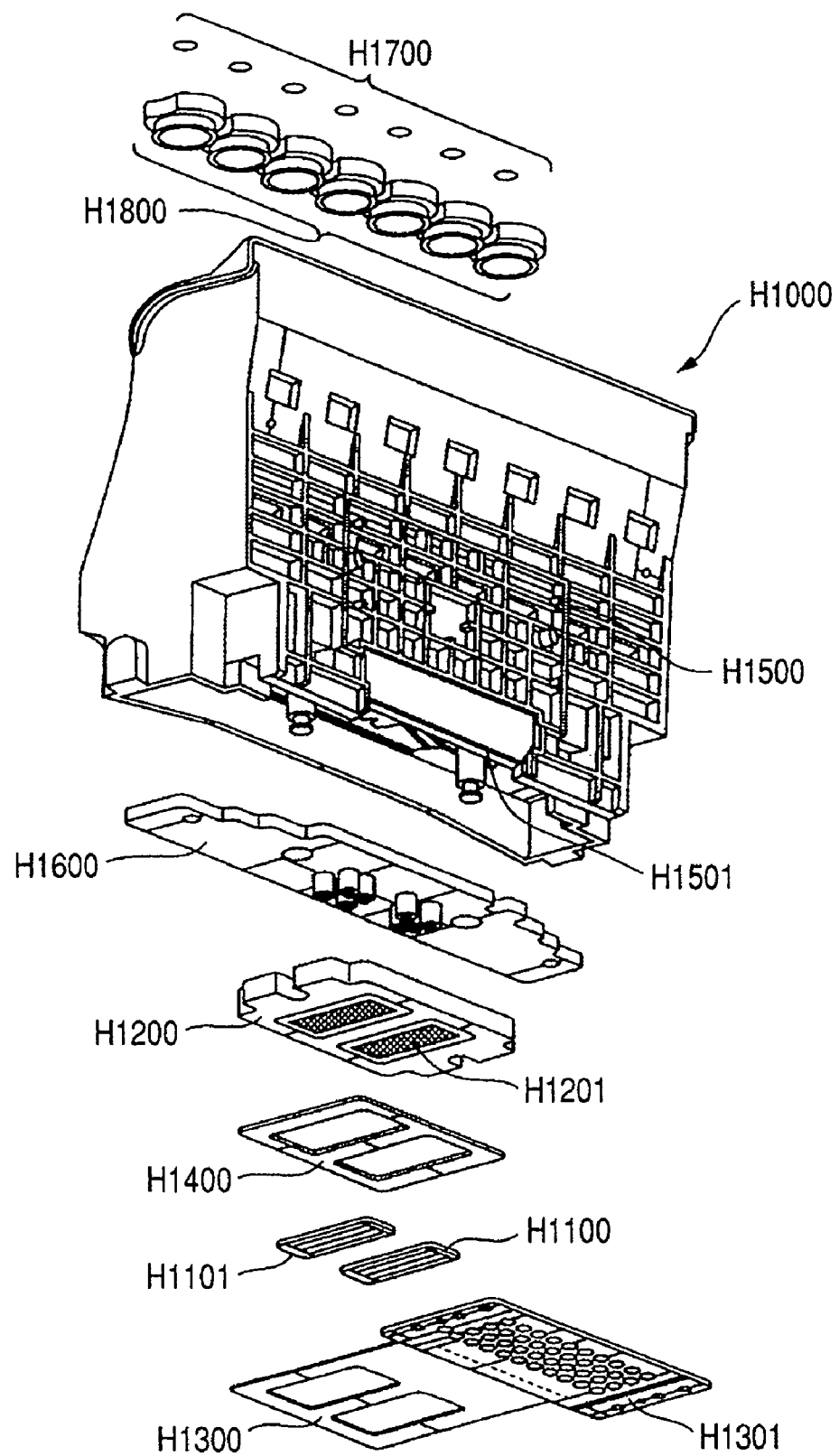
FIG. 5 is an exploded perspective view of the head cartridge.

FIG. 5 shows an exploded perspective view of the head cartridge H1000. In the figure, the head cartridge H1000 includes a first recording element substrate H1100, a second recording element substrate H1101, a first plate H1200, a second plate H1400, an electric wiring substrate H1300, a tank holder H1500, a flow path forming member H1600, a filter H1700, and a seal rubber H1800.

Each of the first recording element substrate H1100 and the second recording element substrate H1101 is an Si substrate having a plurality of recording elements (nozzles) for ejecting ink which are formed on one surface thereof by photolithography. Electric wiring made of Al or the like for supplying power to each recording element is formed by a film formation technique or the like, and a plurality of ink flow paths corresponding to the individual recording elements are also formed by photolithography. Furthermore, ink supply openings for supplying ink to the plurality of ink flow paths are formed so as to open on the back surface.

Figure 6:
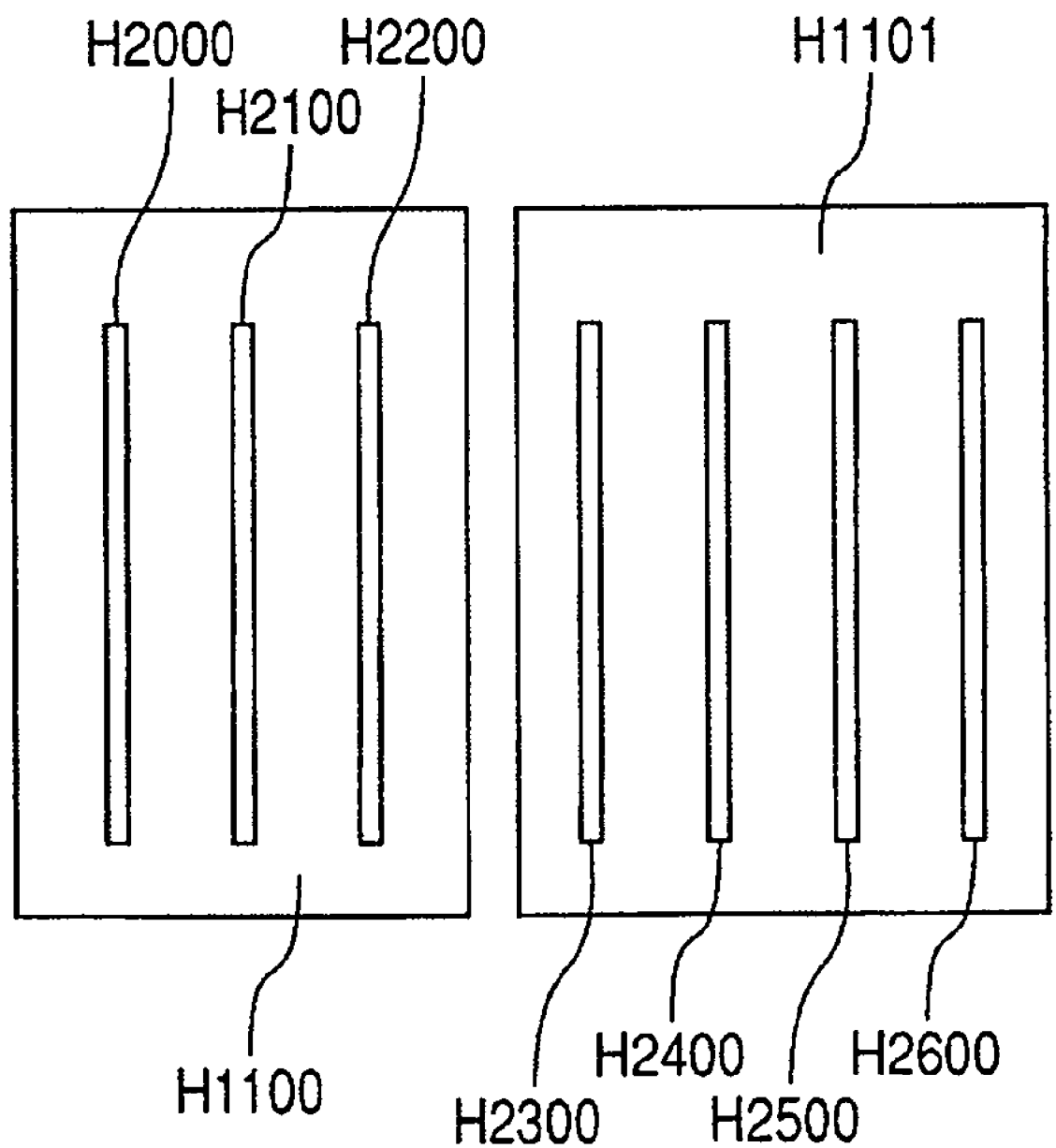
FIG. 6 is a front view showing a recording element substrate in the head cartridge.

FIG. 6 is an enlarged front view for explaining the constitution of each of the first recording element substrate H1100 and the second recording element substrate H1101. Reference characters H2000 to H2600 denote recording element arrays (which may hereinafter be also referred to as nozzle arrays) corresponding to different ink colors. The first recording element substrate H1100 has nozzle arrays for three colors: the nozzle array H2000 to which yellow ink is supplied, the nozzle array H2100 to which magenta ink is supplied, and the nozzle array H2200 to which cyan ink is supplied. The second recording element substrate H1101 has nozzle arrays for four colors: the nozzle array H2300 to which light cyan ink is supplied, the nozzle array H2400 to which black ink is supplied, the nozzle array H2500 to which orange ink is supplied, and the nozzle train H2600 to which light magenta ink is supplied.

Each nozzle array is constituted by 768 nozzles arranged at an interval of 1,200 dpi (dot/inch; reference value) in the direction in which a recording medium is conveyed, and each nozzle ejects about 2 picoliter of ink droplet. An opening area in each nozzle ejection orifice is set to about 100 μm2. The first recording element substrate H1100 and the second recording element substrate H1101 are bonded and fixed to the first plate H1200 having formed thereon ink supply openings H1201 for supplying ink to the first recording element substrate H1100 and the second recording element substrate H1101.

The second plate H1400 having openings is also bonded and fixed to the first plate H1200. The second plate H1400 holds the electric wiring substrate H1300 in such a manner that the electric wiring substrate H1300, the first recording element substrate H1100, and the second recording element substrate H1101 are electrically connected.

The electric wiring substrate H1300 applies an electrical signal for causing each of the nozzles formed on the first recording element substrate H1100 and the second recording element substrate H1101 to eject ink. The electric wiring substrate H1300 has electric wiring corresponding to each of the first recording element substrate H1100 and the second recording element substrate H1101; and an external signal input terminal H1301 which is positioned at an end portion of the electric wiring to receive an electrical signal from the recording apparatus main body. The external signal input terminal H1301 is positioned and fixed to the back surface side of the tank holder H1500.

Meanwhile, the flow path forming member H1600 is fixed by, for example, ultrasonic welding to the tank holder H1500 for holding the ink tanks H1900. Thus, an ink flow path H1501 passing from the ink tanks H1900 to the first plate H1200 is formed.

The filter H1700 is arranged at an end portion on the ink tank side of the ink flow path H1501 engaged with the ink tanks H1900, so that the filter H1700 prevents dust from entering from the outside. The seal rubber H1800 is mounted on the portion at which the ink flow path H1501 is engaged with the ink tanks H1900 to prevent ink from evaporating from the portion.

Furthermore, as described above, the head cartridge H1000 is constituted by connecting through bonding or the like a tank holder portion composed of the tank holder H1500, the flow path forming member H1600, the filter H1700, and the seal rubber H1800, and the recording head portion H1001 composed of the first recording element substrate H1100, the second recording element substrate H1101, the first plate H1200, the electric wiring substrate H1300, and the second plate H1400.

Description has been made here by taking, as an example of an embodiment of a recording head, a recording head according to a bubble jet (registered trademark) system that performs recording by means of an electrothermal transducer (recording element) for generating thermal energy for causing ink to generate film boiling in accordance with an electrical signal.

The representative structure and principle of a bubble jet system are preferably basic principles disclosed in, for example, descriptions of U.S. Pat. Nos. 4,723,129 and 4,740,796. The system is applicable to any one of so-called an on-demand type and a continuous type. In particular, the system is effective for the on-demand type because of the following reason. At least one driving signal which corresponds to recording information and causes a sudden increase in temperature exceeding nuclear boiling is applied to an electrothermal transducer arranged in correspondence with a sheet or liquid flow path holding a liquid (ink), to thereby cause the electrothermal transducer to generate thermal energy. Then, a thermal action surface of a recording head is caused to generate film boiling. As a result, an air bubble in the liquid (ink) can be efficiently formed so as to be in one-to-one correspondence with the driving signal. The growth and contraction of the air bubble cause the liquid (ink) to be ejected through an opening for ejection, thereby forming at least one droplet. The driving signal is more preferably of a pulse shape because the growth and contraction of an air bubble can be performed immediately and appropriately, and hence the liquid (ink) can be ejected with excellent responsiveness.

An example of a second embodiment of an ink jet recording apparatus utilizing mechanical energy includes an on-demand ink jet recording head including: a nozzle forming substrate having a plurality of nozzles; a pressure generating element arranged so as to be opposed to the nozzles and composed of a piezoelectric material and a conductive material; and ink filling the surroundings of the pressure generating element, wherein the pressure generating element is displaced by an applied voltage to eject a small ink droplet from a nozzle.

The ink jet recording apparatus is not limited to the above-described apparatus in which a head and an ink tank are separated, and may be one in which a head and an ink tank are integrated so that they ate unseparable. The ink tank may be separably or unseparably integrated with the head and it may be mounted on a carriage, or it may be mounted at a fixing portion of an apparatus to supply ink to a recording head through an ink supply member such as a tube. When the ink tank is provided with a constitution for applying a preferable negative pressure to the recording head, an absorber may be arranged in an ink storage portion of the ink tank, or the ink tank may have a flexible ink storage bag and a spring portion for applying bias to expand the internal volume of the bag. The recording apparatus may adopt a serial recording system as described above, or may be in the form of a line printer obtained by aligning recording elements over the range corresponding to the entire width of a recording medium.

EXAMPLES

Hereinafter, the present invention will be described in more detail by way of examples and comparative examples. However, the present invention is not limited to the following examples without departing from the gist of the present invention. Unless otherwise stated, the term "part" of each ink component in examples and comparative examples represents "part by mass".

<Preparation of coloring material>

(Preparation of Exemplified Compound 1)

A compound represented by the following formula (A) was added to water to which sodium hydroxide had been added, and thereby dissolved. To resulting solution was added an aqueous solution of sodium nitrite, whereby diazotization took place. The resulting diazo turbid solution was added dropwise to an aqueous alkaline solution of 6-amino-1-hydroxynaphthalene-3,5-disulfonic acid, whereby a coupling reaction occurred. The resulting product was then salted out with sodium chloride. The salted out product was filtered and washed. Subsequently, the above compound was added to water to which sodium hydroxide had been added, and thereby dissolved. To the resulting solution were added hydrochloric acid and sodium nitrite, whereby diazotization took place. To this diazo turbid solution were added 8-amino-1-hydroxynaphthalene-3,6-disulfonic acid and then sodium carbonate. The resulting mixture was stirred overnight, to thereby prepare a reaction solution (A1). Next, 1-amino-2-benzenesulfonic acid was added to water to which sodium hydroxide had been added, and thereby dissolved. To the resulting solution was added an aqueous solution of sodium nitrite, whereby diazotization took place. This diazo turbid solution was added dropwise to an aqueous alkaline solution of 6-amino-1-hydroxynaphthalene-3-sulfonic acid, whereby a coupling reaction occurred. The resulting product was then salted out with sodium chloride. The salted out product was filtered and washed. Subsequently, the above compound was added to water to which sodium hydroxide had been added, and thereby dissolved. To the resulting solution were added hydrochloric acid and sodium nitrite, whereby diazotization took place. This diazo turbid solution was added to the above-described reaction solution (A1), whereby a coupling reaction occurred. The resulting product was then salted out with sodium chloride. The salted out product was filtered and washed, to thereby prepare the Exemplified Compound 1.

Formula (A)

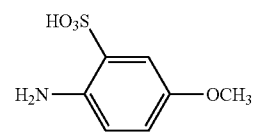

Exemplified Compound 1

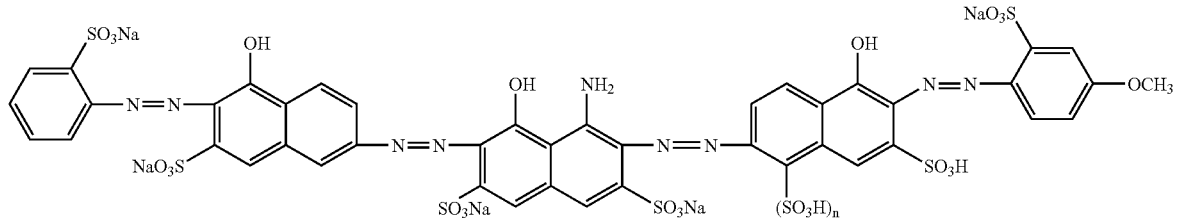

(Preparation of Exemplified Compound 2)

A compound represented by the following formula (B) was added to water to which sodium carbonate had been added, and thereby dissolved. To the resulting solution were added hydrochloric acid and sodium nitrite, whereby diazotization took place. To this diazo turbid solution was added dropwise an aqueous solution of 6-phenylamino-1-hydroxynaphthalene-3-sulfonic acid, and dissolved in the presence of sodium carbonate, to thereby prepare a reaction solution (B1). Next, 2-aminosulfonic acid was dissolved in the presence of sodium hydroxide, and to the resulting solution were added hydrochloric acid and sodium nitrite, whereby diazotization took place. Next, 6-amino-1-hydroxynaphthalene-3-sulfonic acid was dissolved in the presence of sodium hydroxide, and to the resulting solution was added acetic anhydride, whereby acetylation took place. To this was added dropwise the above-described diazo turbid solution in the presence of sodium carbonate, whereby a coupling reaction, to thereby prepare a reaction solution (B2). To this reaction solution (B2) was added sodium hydroxide, followed by addition of sodium chloride, for carrying out salting out, to thereby prepare a compound. The compound was dissolved in water in the presence of sodium hydroxide, and to the resulting solution were added hydrochloric acid and sodium nitrite, whereby diazotization took place. To this diazo turbid solution was dropwise added the reaction solution (B1) in the presence of sodium carbonate, whereby a coupling reaction was completed, to thereby prepare a reaction solution. After this reaction solution had been salted out with sodium chloride, the resulting product was filtered, to thereby prepare an intermediate product (B3). TO N,N-dimethylformamide were added 2-nitro-4-cresol, toluene and potassium hydroxide, whereby water was distilled off by azeotropy with the toluene. To the resulting product was added dropwise propane sultone, followed by addition of sodium hydroxide. This solution was concentrated, and to the concentrate was then added palladium carbon in an autoclave. Hydrogen gas was put therein, to thereby prepare a solution. To this solution were added hydrochloric acid and sodium nitrite, whereby diazotization took place. The reaction solution (B1) was added dropwise to the resulting reaction product, whereby a coupling reaction was completed in the presence of sodium hydroxide, to thereby preparing a reaction solution. To this reaction solution were added hydrochloric acid and sodium nitrite, whereby diazotization took place. The resulting diazo turbid solution was added to an aqueous solution in which the above-described intermediate product (B3) had been dissolved, whereby a coupling reaction was completed. The resulting product was then salted out with sodium chloride. The salted out product was filtered and washed, to thereby prepare the Exemplified Compound 2.

Formula (B)

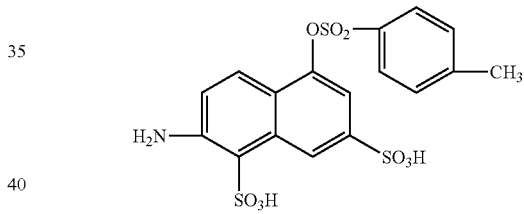

Exemplified Compound 2

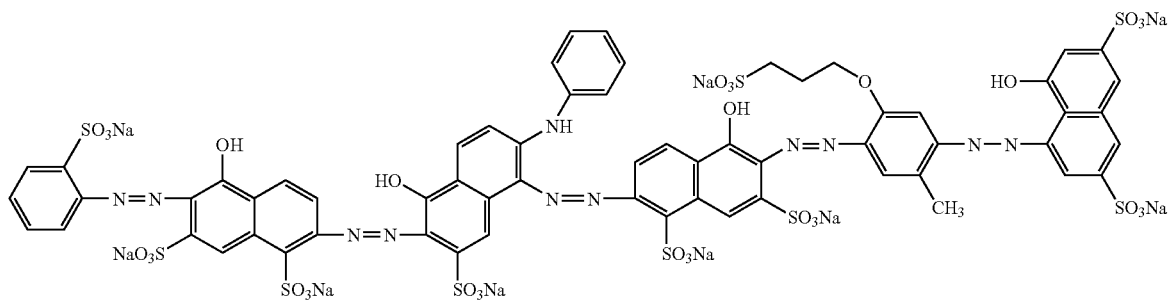

<Preparation of Ink>

The components shown in each of Tables 3 and 4 below were mixed and sufficiently stirred. After that, the resultant mixture was filtered through a membrane filter having a pore size of 0.2 μm under pressure to prepare ink of each of Examples 1 to 14 and Comparative Examples 1 to 6.

TABLE 3

| | Example | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Exemplified Compound 1 | 5 | 5 | 5 | 5 | 5 | 5 | 2 | 2 | 1 | 1 | 5 | 5 | 5 | 5 |
| Exemplified Compound 2 | | | | | | | 3 | 3 | 2 | 2 | | | | |
| C.I. Direct Orange 39 | | | | | | | | | 2 | 2 | | | | |
| Ethylene glycol | 15 | | 20 | | 25 | | 25 | | 25 | | 30 | | 15 | |
| Diethylene glycol | | 15 | | 20 | | 25 | | 25 | | 25 | | 30 | | 15 |
| Glycerin | | | | | | | | | | | | | 5 | 5 |
| Urea | | | | | | | | | | | | | | |
| Acetylenol E100 (*1) | 1 | 1 | 1 | 1 | 1 | 1 | 1 | 1 | 1 | 1 | 1 | 1 | 1 | 1 |
| Ion-exchanged water | 79 | 79 | 74 | 74 | 69 | 69 | 69 | 69 | 69 | 69 | 64 | 64 | 74 | 74 |

(*1) Acetyleneglycol ethylene oxide adduct (manufactured by Kawaken Fine Chemicals Co., Ltd.)

TABLE 4

| | Comparative Example | | | | | |
|---|---|---|---|---|---|---|
| | 1 | 2 | 3 | 4 | 5 | 6 |
| Exemplified Compound 1 | 5 | 5 | 5 | 5 | 5 | 5 |
| Exemplified Compound 2 | | | | | | |
| C.I. Direct Orange 39 | | | | | | |
| Ethylene glycol | 14 | | 31 | | | |
| Diethylene glycol | | 14 | | 31 | | |
| Glycerin | | | | | 25 | |
| Urea | | | | | | 25 |
| Acetylenol E100 (*1) | 1 | 1 | 1 | 1 | 1 | 1 |
| Ion-exchanged water | 80 | 80 | 63 | 63 | 69 | 69 |

(*1) Acetylene glycol ethylene oxide adduct (manufactured by Kawaken Fine Chemicals Co., Ltd.)

<Evaluation>

The ink of each of Examples 1 to 14 and Comparative Examples 1 to 6 thus prepared was mounted on an ink jet printer as an on-demand ink jet recording apparatus using a heater element as an energy source for ink ejection (manufactured by CANON Inc., a modified device of PIXUS 950i), and was evaluated for the following evaluation items.

(1) Sticking Recovery Property

Ink was filled into the recording head portion. The recording head portion was removed, and an ejection orifice was exposed to an environmental atmosphere, and left for 2 weeks in an environment having a temperature of 35° C. and a humidity of 10%. After that, the recording head portion was mounted on a printer main body again, and evaluation for sticking recovery property was performed. The criteria for sticking recovery property are as follows. Tables 5 and 6 show the results of the evaluation.

A: After a recording head has been mounted, all nozzles are recovered to be capable of ejecting ink without any problem through purging twice or less.

B: After a recording head has been mounted, all nozzles are recovered to be capable of ejecting ink without any problem through purging three or four times.

C: After a recording head has been mounted, some nozzles are incapable of ejecting ink through purging five or more times.

(2) Storage Stability

Ink was charged into a Teflon jar, and the whole was stored in an environment having a temperature of 60° C. for 10 days. The absorbance spectra of the ink were measured before and after the storage, and the residual ratio of peak intensity at the maximum absorbance of the ink was calculated. The peak intensity at the maximum absorbance was measured by means of a spectrophotometer (trade name: U-3300; manufactured by Hitachi, Ltd.) in the range of 380 nm to 780 nm. The ink was diluted with pure water by 2,000-fold before the measurement. The criteria for storage stability are as follows. Tables 5 and 6 show the results of the evaluation.

A: The residual ratio of peak intensity at the maximum absorbance is 99% or more.

B: The residual ratio of peak intensity at the maximum absorbance is 95% or more and less than 99%.

C: The residual ratio of peak intensity at the maximum absorbance is less than 95%.

(3) Continuous Ejection Property

The above-described printer was filled with ink, and while $1\times10^8$ pulses per nozzle were applied in an environment having a temperature of 23° C. and a relative humidity of 55%, continuous printing was performed. The initial and final states of a recorded article after the continuous printing were compared with each other. The criteria for continuous ejection property are as follows. Tables and 6 show the results of the evaluation.

A: No change of a final image from an initial image is observed.

B: A slight change of a final image from an initial image may be observed, but is acceptable.

C: A graze may occur on a recorded article before continuous printing is completed.

(4) Image Density

The above-described printer was filled with ink, and printing was performed on an ink jet glossy recording medium PR101 (manufactured by CANON Inc.) at a duty of 100%. After that, the recorded medium was dried for 24 hours and the image density of an image after drying was measured. A spectrophotometer (Spectrolino; manufactured by Gretag Macbeth) was used for the measurement. The criteria for an image density are as follows. Tables 5 and 6 show the results of the evaluation.

A: An image density is 2.2 or more.
B: An image density is 2.1 or more and less than 2.2.
C: An image density is less than 2.1.

(5) Tint

The above-described printer was filled with ink, and printing was performed on an ink jet glossy recording medium PR101 (manufactured by CANON Inc.) at a duty of 100%. After that, the recorded medium was dried for 24 hours and the tint of an image after drying was measured. A spectrophotometer (Spectrolino; manufactured by Gretag Macbeth) was used for the measurement. The criteria for a tint are as follows. Tables 5 and 6 show the results of the evaluation.

A: C* is less than 10.
B: C* is 10 or more and less than 20.
C: C* is 20 or more.

TABLE 5

| | Example | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Sticking recovery property | B | B | A | A | A | A | A | A | A | A | A | A | A | A |
| Storage stability | A | A | A | A | A | A | A | A | A | A | A | A | A | A |
| Continuous ejection property | A | A | A | A | A | A | A | A | A | B | B | A | A | A |
| Image density | B | B | B | B | B | B | A | A | A | A | B | B | B | B |
| Tint | B | B | B | B | B | B | B | B | A | A | B | B | B | B |

TABLE 6

| | Comparative Example | | | | | |
|---|---|---|---|---|---|---|
| | 1 | 2 | 3 | 4 | 5 | 6 |
| Sticking recovery property | C | C | A | A | A | A |
| Storage stability | A | A | A | A | A | C |
| Continuous ejection property | A | A | C | C | C | A |
| Image density | B | B | B | B | B | B |
| Tint | B | B | B | B | B | B |

As can be seen from Examples 1 to 14 and Comparative Examples 1 to 6, the combined use of the coloring material represented by the general formula (I) typified by Exemplified Compound 1 and 15 mass % or more and 30 mass % or less of ethylene glycol or diethylene glycol with respect to the total amount of ink can satisfy all of sticking recovery property, storage stability, and continuous ejection property. As can be seen from Examples 5, 6, 7 and 8, the combined use of the coloring material represented by the general formula (I) typified by Exemplified Compound 1 and the coloring material represented by the general formula (II) typified by Exemplified Compound 2 additionally increases an image density. As can be seen from Examples 5, 6, 9 and 10, the combined use of the coloring material represented by the general formula (I) typified by Exemplified Compound 1, the coloring material represented by the general formula (II) typified by Exemplified Compound 2 and C.I. Direct Orange 39 provides preferable black ink with an additionally improved tint and a small C*.

This present application claims the priorities for each of Japanese Patent Application No. 2004-252204 filed on Aug. 31, 2004 and No. 2005-246157 filed on Aug. 26, 2005, which are hereby incorporated by reference herein.

What is claimed is:

1. An ink jet black ink comprising at least a coloring material,
wherein the coloring material is a compound represented by the following general formula (I) or a salt thereof; and
wherein the ink jet black ink further comprises ethylene glycol or diethylene glycol, and
wherein a content of ethylene glycol or diethylene glycol is 15 mass % or more and 30 mass % or less with respect to a total mass of the ink jet black ink:

general formula (I):

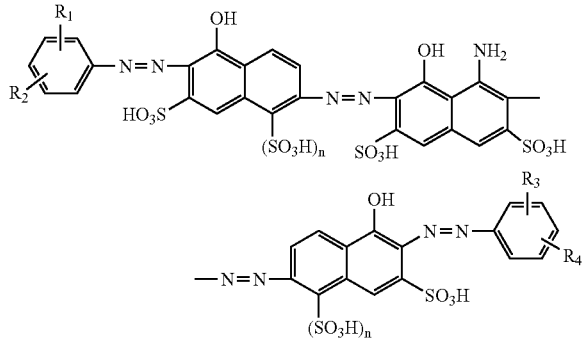

wherein $R_1$, $R_2$, $R_3$ and $R_4$ each independently represent a hydrogen atom; a hydroxyl group; an amino group; a carboxyl group; a sulfonic group; an alkyl group having 1 to 4 carbon atoms; an alkoxy group having 1 to 4 carbon atoms; an alkoxy group substituted with a hydroxyl group, an alkoxy group having 1 to 4 carbon atoms, a sulfonic group, or a carboxyl group; an alkoxy group having 1 to 4 carbon atoms which may be further substituted with a carboxyl group or a sulfonic group; or an amino group substituted with a phenyl group, an alkyl group, or an acyl group, and n represents 0 or 1.

2. An ink jet black ink according to claim 1, further comprising a compound represented by the following general formula (II) or a salt thereof as the coloring material:

general formula (II):

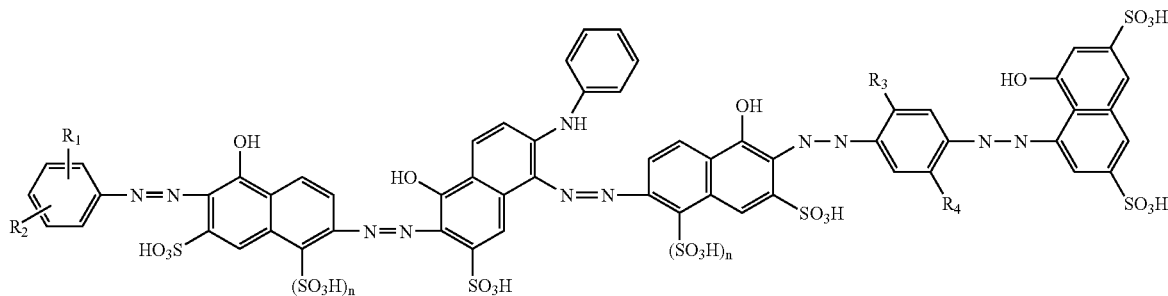

wherein $R_1$ and $R_2$ each independently represent a hydrogen atom; a hydroxyl group; an amino group; a carboxyl group; a sulfonic group; an alkyl group having 1 to 4 carbon atoms; or an alkoxy group having 1 to 4 carbon atoms, and $R_3$ and $R_4$ represent a hydrogen atom; an alkyl group having 1 to 4 carbon atoms; an alkoxy group having 1 to 4 carbon atoms; a hydroxyl group; an alkyl group having 1 to 4 carbon atoms which may be substituted with a hydroxyl group or an alkoxy group having 1 to 4 carbon atoms; an alkoxy group having 1 to 4 carbon atoms which may be substituted with a hydroxyl group, an alkoxy group having 1 to 4 carbon atoms, a sulfonic group, or a carboxyl group; or an amino group substituted with an alkyl group or an acyl group, and n represents 0 or 1.

3. An ink jet black ink according to claim 1, further comprising, as the coloring material, at least one compound selected from the group consisting of a condensed dye or a salt thereof of a compound represented by the following general formula (III) and a compound represented by the following general formula (IV) and a dye obtained by the reduction of the condensed dye or the salt thereof wherein the counter ion of the dye after the condensation or reduction is a hydrogen ion, an alkali metal ion, a cation of an organic amine, or an ammonium ion:

general formula (III):

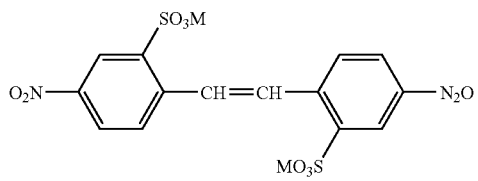

wherein M represents a hydrogen atom or an alkali metal atom, general formula (IV):

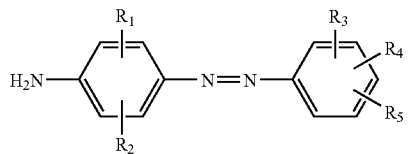

wherein $R_1$, $R_2$, $R_3$, $R_4$ and $R_5$ each independently represent a hydrogen atom; a halogen atom; a hydroxyl group; a sulfonic group; a carboxyl group; an alkyl group having 1 to 4 carbon atoms; or an alkoxy group having 1 to 4 carbon atoms.

4. An ink set, comprising a plurality of inks, the ink set comprising the ink jet black ink according to claim 1 as a black ink.

5. An ink jet recording method, comprising ejecting an ink by an ink jet method, wherein the ink comprises the ink jet black ink according to claim 1.

6. An ink cartridge, comprising an ink storage portion for storing ink, wherein the ink comprises the ink jet black ink according to claim 1.

7. A recording unit, comprising an ink storage portion for storing ink and a recording head for ejecting the ink, wherein the ink comprises the ink jet black ink according to claim 1.

8. An ink jet recording apparatus, comprising an ink storage portion for storing ink and a recording head for ejecting the ink, wherein the ink comprises the ink jet black ink according to claim 1.

* * * * *

UNITED STATES PATENT AND TRADEMARK OFFICE
CERTIFICATE OF CORRECTION

PATENT NO.        : 7,247,196 B2
APPLICATION NO.   : 11/362029
DATED             : July 24, 2007
INVENTOR(S)       : Shin-ichi Sato et al.

It is certified that error appears in the above-identified patent and that said Letters Patent is hereby corrected as shown below:

COLUMN 2

Line 31, "acyl group," should read --acyl group;--.

COLUMN 3

Line 11, "comprise" should read --comprises--.

Line 41, "acyl group," should read --acyl group;--.

COLUMNS 3-4

Lines 52-63, the chemical drawing shown beneath "General Formula (II):" should be deleted and replaced with the following chemical drawing:

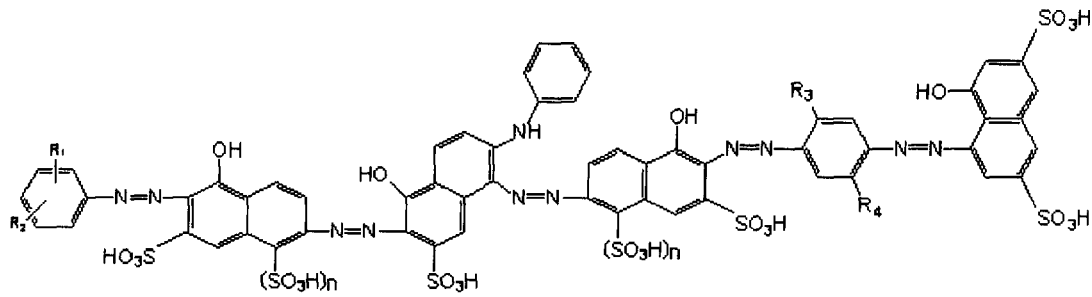

COLUMN 4

Line 5, "atoms," should read --atoms;--.

Line 32, "acyl group," should read --acyl group;--.

COLUMN 5

Line 33, "alkyl-group" should read --alkyl group--.

COLUMN 7

Line 17, "amino group" should read --amino group;--.

Line 25, "acyl group," should read --acyl group;--.

CERTIFICATE OF CORRECTION (continued)
U.S. Pat. No. 7,247,196 B2

COLUMNS 9-10

Lines 3-13, the chemical drawing shown beneath "General Formula (II)" should be deleted and replaced with the following chemical drawing:

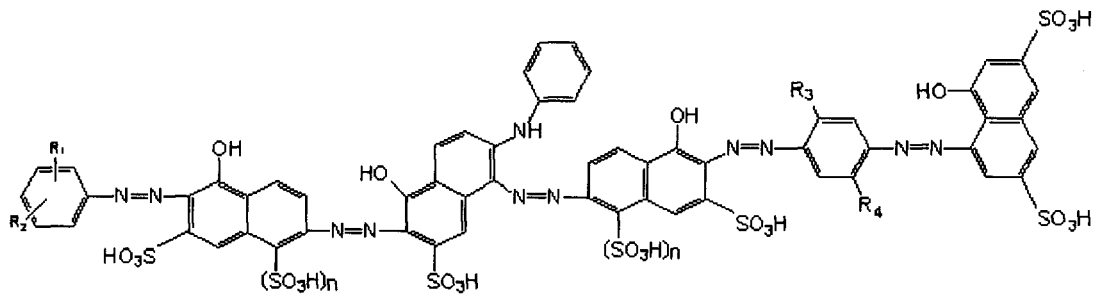

Lines 40-50, the chemical drawing shown beneath "Exemplified Compound 2" should be deleted and replaced with the following chemical drawing:

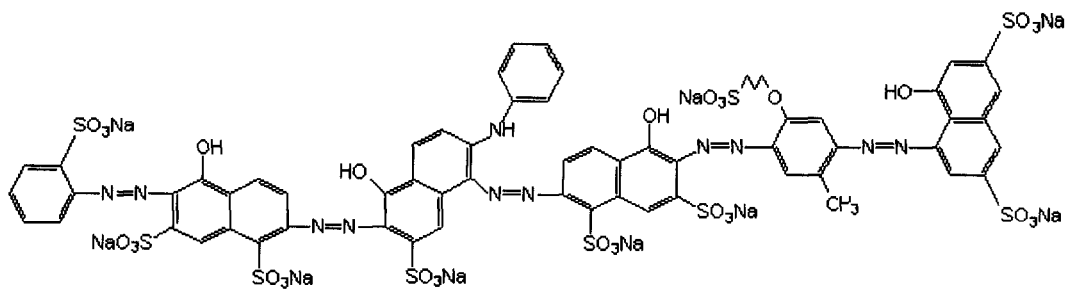

COLUMN 9

Line 22, "atoms," should read --atoms;--.

Line 31, "acyl group," should read --acyl group;--.

COLUMN 12

Line 65, "a" should be deleted.

COLUMN 16

Line 27, "100 μm2" should read --100 $\mu m^2$--.

COLUMN 17

Line 17, "of" should read --of a--.

Line 18, "an" should be deleted.

Line 54, "ate" should read --are--.

COLUMN 18

Line 20, "To" should read --To the--.

COLUMN 19

Line 33, "reaction," should read --reaction took place,--.

Line 62, "TO" should read --To--.

COLUMNS 19-20

Lines 45-56, the chemical drawing shown beneath "Exemplified Compound 2" should be deleted and replaced with the following chemical drawing:

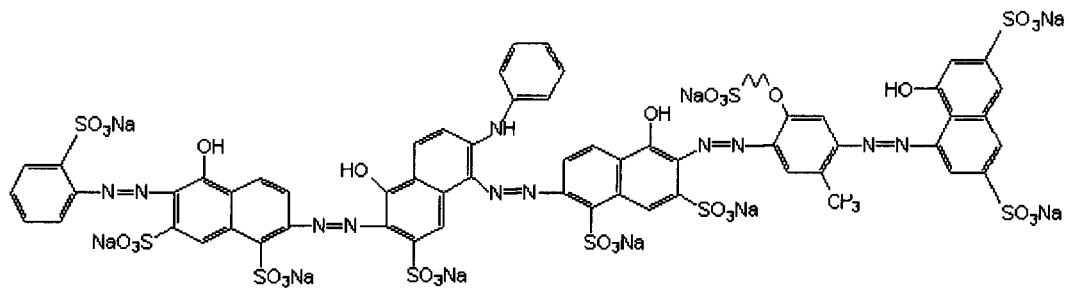

COLUMN 20

Line 22, "preparing" should read --prepare--.

COLUMN 22

Line 52, "Tables" should read --Tables 5--.

COLUMN 24

Line 62, "acyl group," should read --acyl group;--.

CERTIFICATE OF CORRECTION (continued)
U.S. Pat. No. 7,247,196 B2

COLUMN 25

Line 19, "atoms," should read --atoms;--.

Line 28, "acyl group," should read --acyl group;--.

COLUMNS 25-26

Lines 3-13, the chemical drawing should be deleted and replaced with the following chemical drawing:

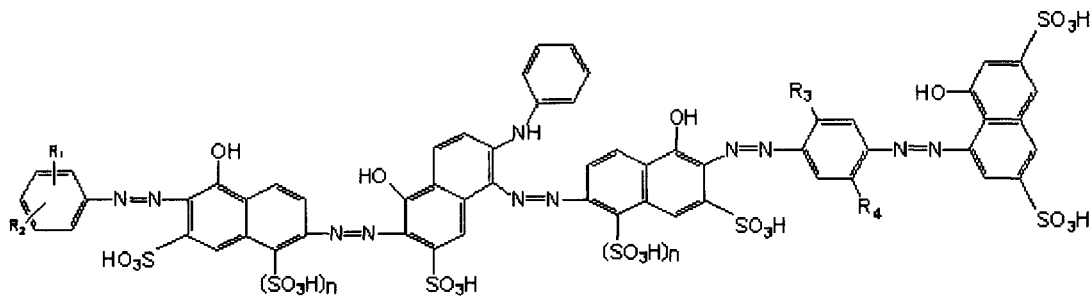

Signed and Sealed this

Sixteenth Day of February, 2010

David J. Kappos
*Director of the United States Patent and Trademark Office*